Patented Dec. 2, 1952

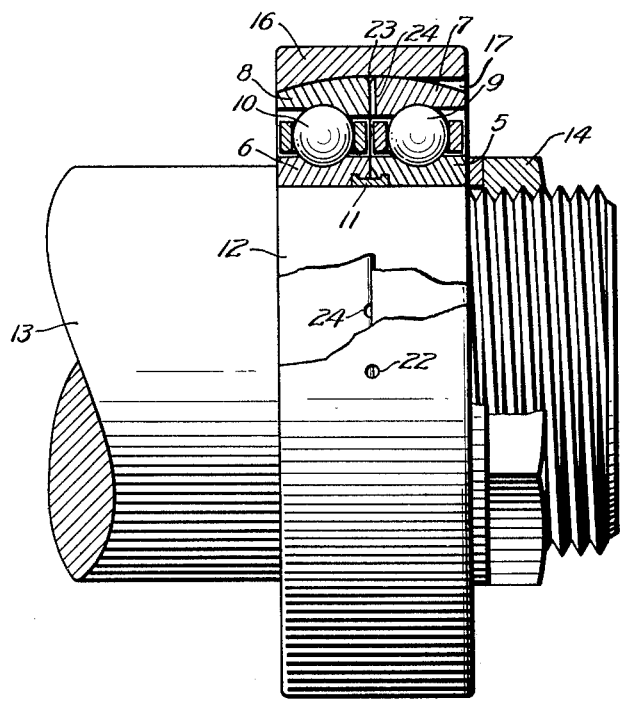
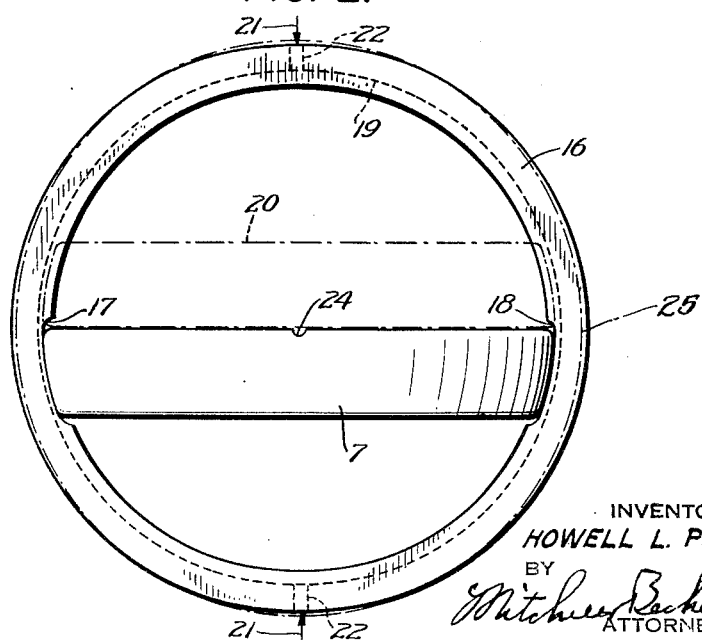

2,620,241

UNITED STATES PATENT OFFICE 2,620,241

BEARING

Howell L. Potter, New Britain, Conn., assignor to The Fafnir Bearing Company, New Britain, Conn., a corporation of Connecticut Application January 6, 1949, Serial No. 69,524

3 Claims. (Cl. 308—187)

My invention relates to a self-aligning bearing construction.

It is an object of the invention to provide an improved device of the character indicated.

It is another object to provide an improved self-aligning antifriction-bearing construction, wherein the antifriction bearing may be lubricated from the outside.

It is a further object to provide an improved self-aligning-bearing construction having features of simple assembly and yet not readily susceptible to disassembly.

It is a further object to provide an improved supporting means for a self-aligning bearing.

It is still another object to provide an improved duplex-bearing construction.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a side-elevation view, partly in section, of a self-aligning bearing according to the invention; and Fig. 2 is an end view of the bearing of Fig. 1, shown during the process of assembly.

Briefly stated, my invention contemplates a self-aligning bearing construction wherein the bearing parts are inserted in a seat in such a way that lubricating access is permitted to the internal parts of the bearing, via the seat and via the outer ring of the bearing. In the form to be described, antifriction bearing means is finished with an outer generally spherical convex surface to ride in a suitably formed concave retaining surface of a seating member. Either the outer bearing ring or the seating member is resiliently radially deformable, so that the outer bearing ring may be assembled in the seating member by an endwise insertion. In the described form, end slots assist in this assembly, but in accordance with the invention these slots terminate short of the maximum depth of the seat. Stated in other words, the slot spacing may be less in extent than the maximum diameter of the antifriction bearing means, so that some slight resilient distortion of the seat member or of the outer bearing ring may be necessary in order to snap the outer bearing ring into the seat.

Referring to the drawings, my invention is shown in application to antifriction bearing means of the duplex type, comprising twin sets of inner rings 5—6 and outer rings 7—8 with antifriction elements 9—10 therebetween. The inner rings are shown held together by snap-retainer means 11, and both bearings are shown seated upon a reduced diameter 12 of a shaft 13 and secured thereon by means of a nut 14. Both outer bearing rings 7—8 may be formed with a generally spherical contour so that when mounted back-to-back, as shown, they may present essentially the same continuous outer spherical surface. The generally spherical outer surface of the outer bearing rings 7—8 may self-aligningly ride in an appropriately formed annular concave seating surface on a seating member 16.

The construction thus far described generally resembles that disclosed in the copending application of M. S. Vile, Serial No. 747,655, filed May 13, 1947 and now abandoned.

In said patent application, a means was disclosed for assembling a duplex self-aligning bearing of the general character indicated, and to permit such assembly the outer ring 7 of a first half of the duplex bearing was insertable endwise (see Fig. 2) in chordwise spaced slots 17—18 of width less than the combined width of the fully assembled bearing. In said patent application, the insertion slots ran all the way to the maximum depth 19 of the seating groove in the seating member 16. Once one of the outer bearing rings 7 had been inserted, it had only to be rotated a half turn (so as to assume the dot-dash position of Fig. 2) in order to present a means of access for insertion of the second outer bearing ring 8 through the same slots 17—18. When the second ring had been thus inserted, a simple one-quarter turn of the two outer bearing rings brought both bearing rings into the assembled relationship shown in Fig. 1.

In accordance with the invention, the insertion grooves or slots 17—18 are deliberately shorter than in said patent application; the grooves 17—18 preferably terminate short of the maximum depth of the seating groove in the seating members 16. Stated in other words, the maximum span between grooves 17—18 is preferably less than the maximum diameter of either of the outer bearing rings 7—8. In order then to insert the outer bearing rings 7—8, it becomes necessary to cause a slight distortion of one or the other or both of the outer bearing-ring means and the seating means. Such distortion is illustrated in Fig. 2 by the schematic use of arrows 21 to indicate a diametral compression of the seating ring 16 in order resiliently to spread the span between insertion slots 17—18; the undistorted seating ring 16 is schematically shown by the phantom outline 25. When the bearing ring 7 has been inserted in such a spread seating member 16, the natural resiliency of the members (7—16) will be understood to permit immediate resumption of true circular form, so that there may be a circumferentially continuous support of the inserted bearing rings, as will be clear.

In accordance with a feature of the invention, I provide means whereby lubricant for the bearing rings may be radially introduced in the seating member 16, as through one or two lubricating holes or passages 22 which may be located in an axially central radial plane of the assembled bearing, or at least in a radial plane that is axially removed from the slots 17. The lubricant holes 22 may, if desired, be spaced a maximum from the insertion slots 17—18, and in the form shown the lubricant holes 22 are diametrically opposite on a line generally normal to the chordwise span of the slots 17—18. The lubricating holes 22 preferably communicate with an annularly extending open space or manifold between the outer bearing-ring means 7—8 and the concave seat 19. If the outer bearing-ring means were a single ring, it will be appreciated that a single peripheral groove cut in a central radial plane of such single ring could provide the desired manifold; but, in the form shown, such annular space is provided by a chamfering of the adjacent outer edges of at least one of the two outer bearing rings, as at 23 in the case of the outer bearing ring 8. It will be understood that the space thus provided may constitute an annular lubricating manifold extending continuously about the bearing means. In order to assure the further passage of lubricant direct to the working parts of the bearing, I have shown a number of recessed radially extending grooves 24, which may be generally semicylindrical in shape. The grooves 24 may be formed as part of the outer bearing rings 7—8, and one or two grooves 24 for each outer race ring should suffice for a proper lubrication of the bearing. The chamfers 23 are preferably relatively small and sufficient only to permit manifold distribution of lubricant in the manner described. These chamfered portions preferably do not extend too near to the inner end of the insertion slots 17 and by virtue of such construction, it will be appreciated that the manifold may be completely sealed off and not impaired by the insertion slots 17, within certain limits of misalignment of the bearing means in the seat. The manifolding system thus provides a means for the pressurized introduction of lubricant into a self-aligning bearing.

It will be appreciated that I have described a relatively simple bearing construction and a seating-ring construction permitting an assembly which will more readily retain the assembled elements in assembled relation. Inasmuch as the outer bearing-ring means are necessarily snapped into place, there need be no tendency accidentally to dislodge any part of the assembly. This feature is of importance in the case of duplex bearings of the character indicated, inasmuch as such bearings must be very carefully matched at the factory, and since a mismatch is likely to result from the careless insertion of some odd duplex half into an assembly from which a first half has been dislodged and mislaid. My invention will also be appreciated as having provided an effective means for the pressurized lubrication of a self-aligning bearing.

While I have described my invention in detail for the preferred form shown, it will be understood that modifications may be made within the scope of the invention as defined in the appended claims.

I claim:

1. In a self-aligning bearing assembly of the character indicated, duplex antifriction-bearing means including a pair of bearings with inner rings and outer rings spaced by antifriction elements, said outer rings each being formed with generally spherical seating surfaces such that, when said outer rings are juxtaposed, their outer surfaces form a substantially continuous substantially spherical seating surface, a seat-ring member having a concave spherical seat to receive said outer bearing rings, said seat-ring member having lateral entrance slots for insertion of said outer rings, said slots terminating substantially short of the plane passing through the center of said spherical seating surface and normal to the axis of said seat-ring member, the outer adjacent peripheral edges of said outer rings being chamfered to an axial extent substantially less than the axial space between said normal plane and the inner terminating plane of said slots, whereby a sealed circumferential lubricant manifold may be thereby defined in cooperation with said seat for a relatively substantial range of bearing misalignment in said seat-ring member, the adjacent end faces of said outer bearing rings having generally radially directed grooves therein, whereby lubricant in such manifold may be conducted to said antifriction elements regardless of the relative angular orientation of said outer bearing rings over a wide range of such angular orientations, and lubricant-supply means carried by said seat member and serving said manifold.

2. In a self-aligning bearing assembly of the character indicated, antifriction-bearing means including outer-race-ring means with a generally spherical convex seating surface, said outer-race-ring means having a generally centrally located and radially directed lubricating passage communicating between the outer and inner surfaces thereof, seat-ring means for said outer-race-ring means and including a circumferentially extending concave spherical seating surface to accommodate said outer-race-ring means, whereby the axis of said race-ring means may be freely misaligned from the longitudinal axis of said seat-ring means about a misalignment center, said seat-ring means having a lubricating passage communicating with said concave surface generally in a plane normal to said longitudinal axis and through said center, circumferentially extending manifolding means carried with one of said ring means and communicating with the lubricating passage of said one ring means, said seat-ring means having lateral entrance slots for insertion of said race-ring means, said slots terminating substantially short of said normal plane; the relation of effective angular width of said manifolding means and of said passages about said misalignment center, with respect to the angular spacing of the slot endings from said normal plane and about said misalignment center, being such that lubricant supplied from said seat-ring means may only be conducted to the supply passage in said outer-race-ring means and so that there may never be a lubricant connection between the lubricating passage in said seat-ring means and one of said insertion slots.

3. A bearing assembly according to claim 2, in which said manifold means is carried with said outer-race-ring means, and in which the effective angular width of said manifold means about said misalignment center is such that said manifolding means may never simultaneously overlap one of said insertion slots and the lubricating passage in said seat-ring means.

HOWELL L. POTTER.

REFERENCES CITED

The following references are of record in the file of this patent:

UNITED STATES PATENTS

| Number | Name | Date |
|---|---|---|
| 1,262,208 | Kelly | Apr. 9, 1918 |
| 1,492,672 | Brunner | May 6, 1924 |

FOREIGN PATENTS

| Number | Country | Date |
|---|---|---|
| 26,266 | Sweden | July 2, 1908 |